US009498080B2

(12) United States Patent
de Neufville (10) Patent No.: US 9,498,080 B2
(45) Date of Patent: Nov. 22, 2016

(54) SINGLE CUP BREWER WITH TRUNCATED SPHERE PLUG (71) Applicant: David de Neufville, Califon, NJ (US)

(72) Inventor: David de Neufville, Califon, NJ (US)

( * ) Notice: Subject to any disclaimer, the term of this patent is extended or adjusted under 35 U.S.C. 154(b) by 0 days.

(21) Appl. No.: 14/693,111

(22) Filed: Apr. 22, 2015

(65) Prior Publication Data

US 2016/0007793 A1  Jan. 14, 2016

Related U.S. Application Data (60) Provisional application No. 61/998,824, filed on Jul. 9, 2014.

(51) Int. Cl.
*A47J 31/06* (2006.01)
*A47J 31/02* (2006.01)

(52) U.S. Cl.
CPC ...................... *A47J 31/02* (2013.01)

(58) Field of Classification Search
CPC ..... A47J 31/0636; A47J 31/46; A23F 5/262; A23F 3/18
USPC ......... 99/295, 299, 306, 316, 283, 317, 323; 426/77–84, 95, 110, 112, 210, 435
See application file for complete search history.

(56) References Cited

U.S. PATENT DOCUMENTS

| | | | |
|---|---|---|---|
| 111,861 A * | 2/1871 | Miller | A47J 31/02 99/299 |
| 246,785 A | 9/1881 | Kappner | |
| 1,317,717 A | 10/1919 | McKenney | |
| 1,665,143 A | 6/1927 | McMillan et al. | |
| 1,962,493 A * | 6/1934 | Ferris | A47J 31/02 99/299 |
| 2,732,787 A | 1/1956 | Osborne | |
| 4,017,913 A | 4/1977 | Judd | |
| 4,921,712 A * | 5/1990 | Malmquist | A47J 31/057 426/110 |
| 5,725,765 A | 3/1998 | Shen | |
| 5,947,004 A | 9/1999 | Huang | |
| 6,327,965 B1 | 12/2001 | Lin Tien | |
| 6,805,040 B1 | 10/2004 | Chang et al. | |
| 8,485,089 B2 | 7/2013 | Taylor et al. | |
| 2002/0114870 A1 * | 8/2002 | Rebhorn | A23C 9/154 426/120 |
| 2008/0028944 A1 * | 2/2008 | Webster | A47J 31/057 99/283 |
| 2010/0140293 A1 * | 6/2010 | Dubach | B05B 11/048 222/214 |
| 2010/0212509 A1 | 8/2010 | Tien et al. | |

FOREIGN PATENT DOCUMENTS

WO  2014078297 A1  5/2014

* cited by examiner

*Primary Examiner* — Phuong Nguyen
(74) *Attorney, Agent, or Firm* — Brown & Michaels, PC (57) ABSTRACT A single cup brewer includes a steeping cup and a drain plug. The steeping cup includes a sidewall extending from a base to form a contained space. The steeping cup also includes a tapered drain extending from the base and away from the contained space. The tapered drain has a tapered drain hole tapering from a top diameter to a bottom diameter through the base of the steeping cup. The drain plug includes a stem and a tip extending from the stem. The tip has a truncated spherical shape, which is a sphere truncated substantially perpendicular to an axis of the stem on the top surface and the bottom surface of the tip. The truncated spherical shape has a tip diameter greater than a width of the stem, greater than the bottom diameter of the drain hole, and less than the top diameter of the drain hole.

14 Claims, 6 Drawing Sheets

SINGLE CUP BREWER WITH TRUNCATED SPHERE PLUG

REFERENCE TO RELATED APPLICATIONS

This application claims one or more inventions which were disclosed in Provisional Application No. 61/998,824, filed Jul. 9, 2014, entitled "SINGLE CUP COFFEE BREWER WITH NOVEL TRUNCATED BALL DRAIN". The benefit under 35 USC §119(e) of the United States provisional application is hereby claimed, and the aforementioned application is hereby incorporated herein by reference.

BACKGROUND OF THE INVENTION

Field of the Invention

The invention pertains to the field of tea or coffee brewing. More particularly, the invention pertains to a single cup brewer with a spherical or truncated sphere plug.

Description of Related Art

Steeping coffee grounds in hot water and then allowing the resulting coffee to drain by gravity into a receptacle below is known in the art.

U.S. Pat. No. 111,861, entitled "Coffee Pot" and issued Feb. 14, 1871 to Miller, discloses a pot with an inner cylinder for steeping tea or coffee and a drain to allow flow between the inner cylinder and the main chamber.

U.S. Pat. No. 246,785, entitled "Coffee Pot" and issued Sep. 6, 1881 to Kappner, discloses a pot for steeping coffee with a drain to allow flow between an upper chamber and a lower chamber.

U.S. Pat. No. 1,317,717, entitled "Coffee Urn" and issued Oct. 7, 1919 to McKenney, discloses another design of a pot for steeping coffee with a drain to allow flow between an upper portion and a lower portion.

U.S. Pat. No. 1,665,143, entitled "Coffeepot" and issued Apr. 3, 1928 to McMillan et al., discloses another design of a pot for steeping coffee with a drain to allow flow between an upper chamber and a lower chamber.

U.S. Pat. No. 1,962,493, entitled "Coffee Making Apparatus" and issued Jun. 12, 1934 to Ferris, discloses yet another design of a pot for steeping tea or coffee with a drain to allow flow between an upper chamber and a lower chamber.

U.S. Pat. No. 6,327,965, entitled "Safety and Drain-Preventing Infusing Tea Maker" and issued Dec. 11, 2001 to Lin Tien, discloses a single cup coffee or tea steeping pot with a drain in the bottom to allow flow out of the steeping pot and into a cup.

None of these devices, however, can be manufactured using the same type of plastic material throughout, with extreme simplicity, very low manufacturing cost, and easy cleaning in a dishwasher after use.

The above-mentioned patents are hereby incorporated by reference herein.

SUMMARY OF THE INVENTION

A single cup brewer includes a steeping cup and a drain plug. The steeping cup includes a sidewall extending from a base to form a contained space. The steeping cup also includes a tapered drain extending from the base and away from the contained space. The tapered drain has a tapered drain hole tapering from a top diameter to a bottom diameter through the base of the steeping cup. The drain plug includes a stem and a tip extending from a first end of the stem. The tip has spherical shape, or more preferably, a truncated spherical shape truncated substantially perpendicular to an axis of the stem on a top surface of the tip and a bottom surface of the tip opposite the top surface. The spherical or truncated spherical shape has a tip diameter greater than a width of the stem, greater than the bottom diameter of the drain hole, and less than the top diameter of the drain hole.

DETAILED DESCRIPTION OF THE INVENTION

A single cup coffee brewer includes a steeping cup with a tapered drain in the base for steeping the coffee and a drain plug to seal this hole. When the coffee has steeped for the proper time, the drain plug is removed to allow the filtered coffee to drain by gravity into a conventional coffee cup below. The steeping cup has ribs on the inside base to support a conventional 8-inch diameter, round basket filter used in automatic coffee makers. In preferred embodiments, the number of ribs is in the range of nine to thirteen. Most preferably, the number of ribs is eleven. In preferred embodiments, the steeping cup and the drain plug are made of injection-molded polypropylene.

In preferred embodiments, the steeping cup has the following dimensions. The steeping cup has a wall thickness on the sides, base, and ribs, of about 1/16 of an inch. The steeping cup has an outside diameter of about four inches at the top and a height of about two and a half inches. The eleven ribs each have a height of about 3/16 of an inch. The side of the steeping cup has a draft angle of about 1.4 degrees. The drain hole has a tapered section about 0.43 inches long. The drain hole preferably tapers at a taper angle in the range of 1 to 3 degrees. More preferably, the drain hole tapers from a diameter of about 0.390 inches at the top to about 0.360 inches at the bottom with a draft angle of the taper of about two degrees. Two ribbed rings on the bottom of the brewer help position the device on a coffee cup. The outer ring has an inside diameter of about three and three quarters inches, and the inner ring has an outside diameter of about two and one quarter inches.

In preferred embodiments, the drain plug has the following dimensions. The length of the drain plug is about four inches. The diameter of the stem of the drain plug is about 7/32 of an inch. The outside diameter of the bottom end of the drain plug, which seals the drain hole in the steeping cup, is about 0.375 inches.

Due to the elasticity of the material forming tapered drain hole, the drain plug completely seals the tapered hole in the base of the steeping cup against leakage of liquid while the coffee is steeping in the steeping cup. In addition to sealing the hole, the drain plug is also able to tilt at an angle, preferably up to about 8 to 16 degrees from vertical, more preferably up to about 12 degrees from vertical, to contact the rim or sidewall of the steeping cup, while maintaining the seal in the tapered hole. This tilt keeps the stem of the drain plug out of the way during the steeping process. The end of the drain plug may be a complete sphere, but as the tilt of the drain plug is limited to about 12 degrees, a truncated sphere is adequate for sealing and preferable from a plastic injection molding standpoint. Therefore, a truncated sphere is preferably used instead of a full sphere. The truncated sphere is preferably truncated both above and below the centerline of the sphere.

The truncated sphere makes contact with the tapered hole below the centerline of the sphere. Therefore, the required thickness of the truncated sphere above the sphere centerline is less than the required thickness below the centerline. In this particular case, with a tilt of 12 degrees from vertical, the thickness above the centerline is about 0.0326 inches, while the thickness below the centerline is about 0.0454 inches.

As far as injection molding of the steeping cup is concerned, it is preferably an ideal design, as it preferably has constant wall thickness throughout. In addition, there are preferably no "undercuts", which would increase the complexity of the mold.

Figure 1:
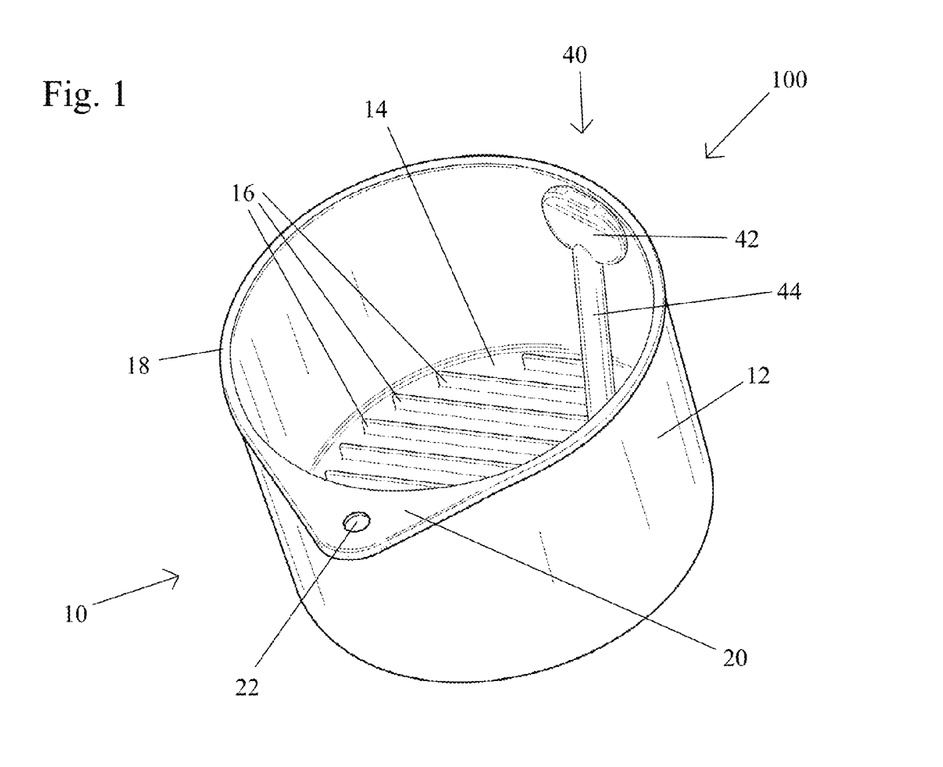
FIG. 1 shows a perspective view of a steeping cup and a drain plug in an embodiment of the present invention.
Figure 2:
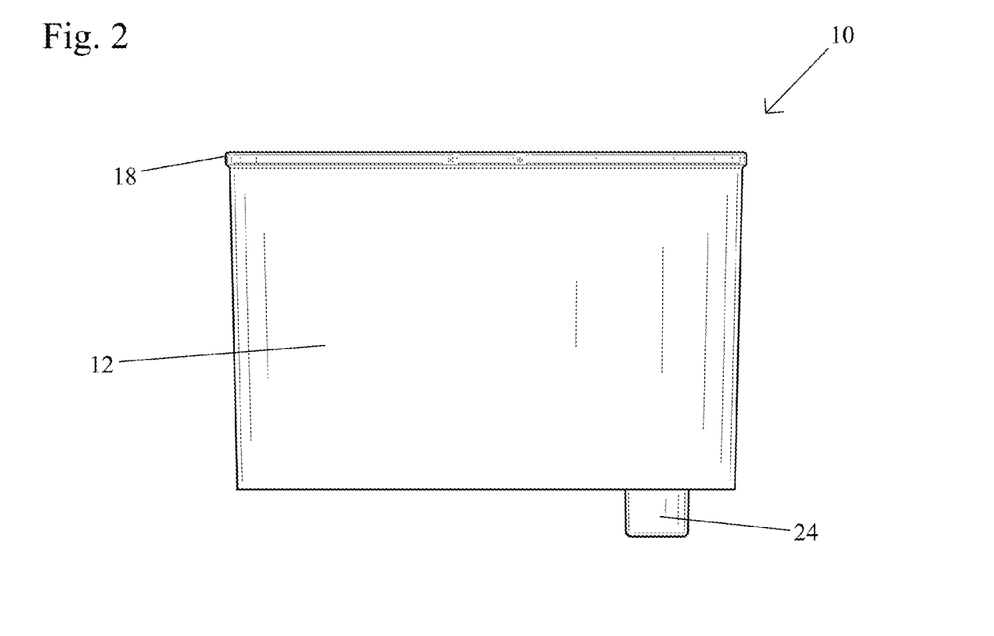
FIG. 2 shows a side view of the steeping cup of FIG. 1.

Referring to FIG. 1, the single cup coffee brewer 100 includes a steeping cup 10 and a drain plug 40. The steeping cup 10 has a substantially cylindrical shape with a sidewall 12, a base 14 with ribs 16, and a rim 18 at the upper edge of the sidewall 12. The rim 18 includes a lip 20 for grasping and holding the steeping cup 10 by hand. The lip 20 includes a lip hole 22 that may be used for attachment of the steeping cup 10. The steeping cup 10 also includes a tapered drain 24, visible in FIG. 2, which extends through and below the base 14 of the steeping cup 10. The drain plug 40 is shown seated in the hole of the tapered drain 24 in FIG. 1 with the stem 44 of the drain plug 40 resting against the top inside sidewall 12 of the steeping cup 10. The drain plug 40 also includes a stem 44 and a tip 46 in the shape of a sphere or a truncated sphere, which is shown in FIG. 5 and FIG. 6 and seals the hole in the tapered drain 24 to prevent leakage of liquid during steeping of the coffee in the steeping cup 10.

Figure 3:
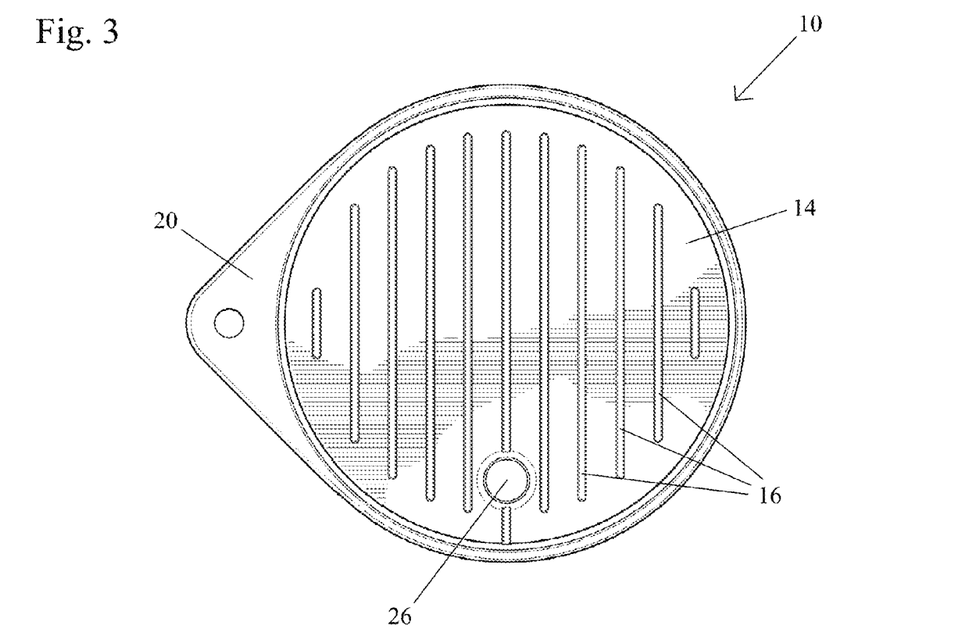
FIG. 3 shows a top view of the steeping cup of FIG. 1.
Figure 4:
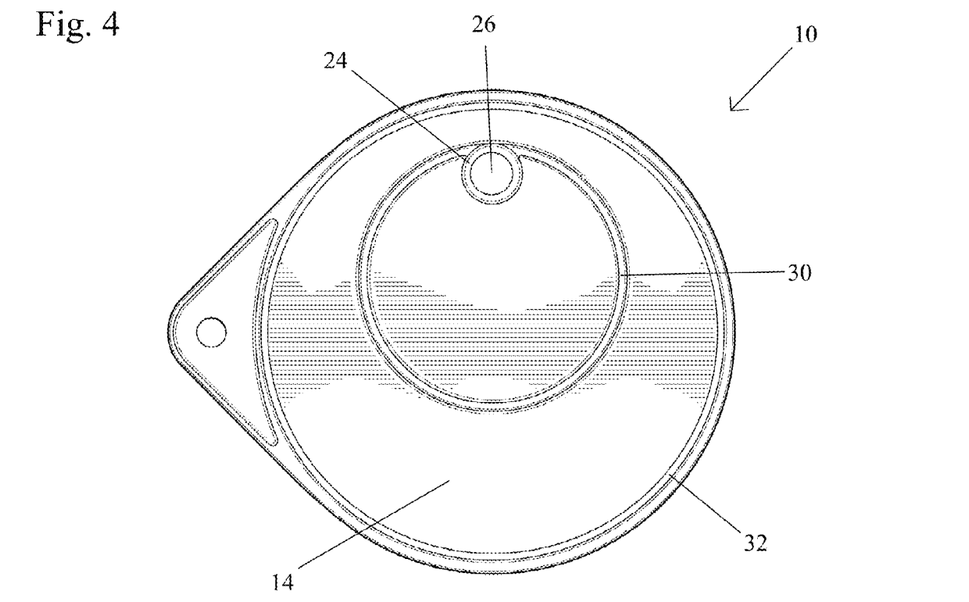
FIG. 4 shows a bottom view of the steeping cup of FIG. 1.

The tapered drain hole 26 is visible in the top and bottom views of FIG. 3 and FIG. 4, respectively. Referring to FIG. 4, in addition to the tapered drain 24, two ribbed rings 30, 32 extend downward from the base 14 of the steeping cup 10. A coffee mug receiving the steeped coffee through the tapered drain 24 preferably has an outside diameter less than the inside diameter of the outer ring 32 and an inside diameter greater than the outside diameter of the inner ring 30.

Figure 5:
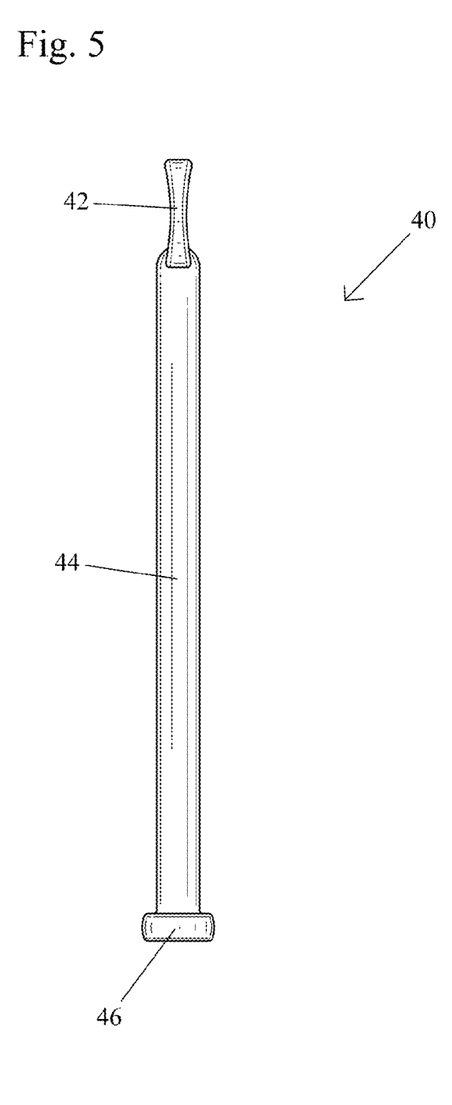
FIG. 5 shows a side view of the drain plug of FIG. 1.
Figure 6:
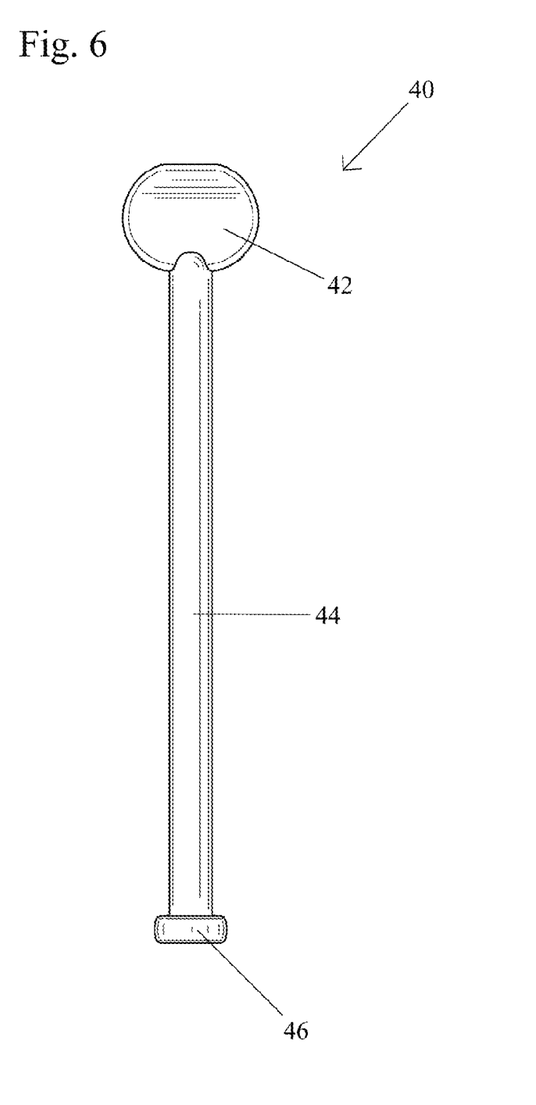
FIG. 6 shows a front view of the drain plug of FIG. 1.

Referring to FIG. 5 and FIG. 6, the drain plug 40 includes a handle 42 and a tip 46 at opposite ends of a stem 44. The stem 44 is preferably cylindrical in shape. The handle 42 is substantially flat with opposing concave surfaces to aid in gripping the handle 42 between a thumb and a finger. The tip 46 has a spherical or a truncated spherical shape with a diameter greater than the diameter of the stem 44. The preferred truncated shape of the tip 46 is shown in more detail in the partial cross sectional views shown in FIG. 8 and FIG. 9.

Figure 7:
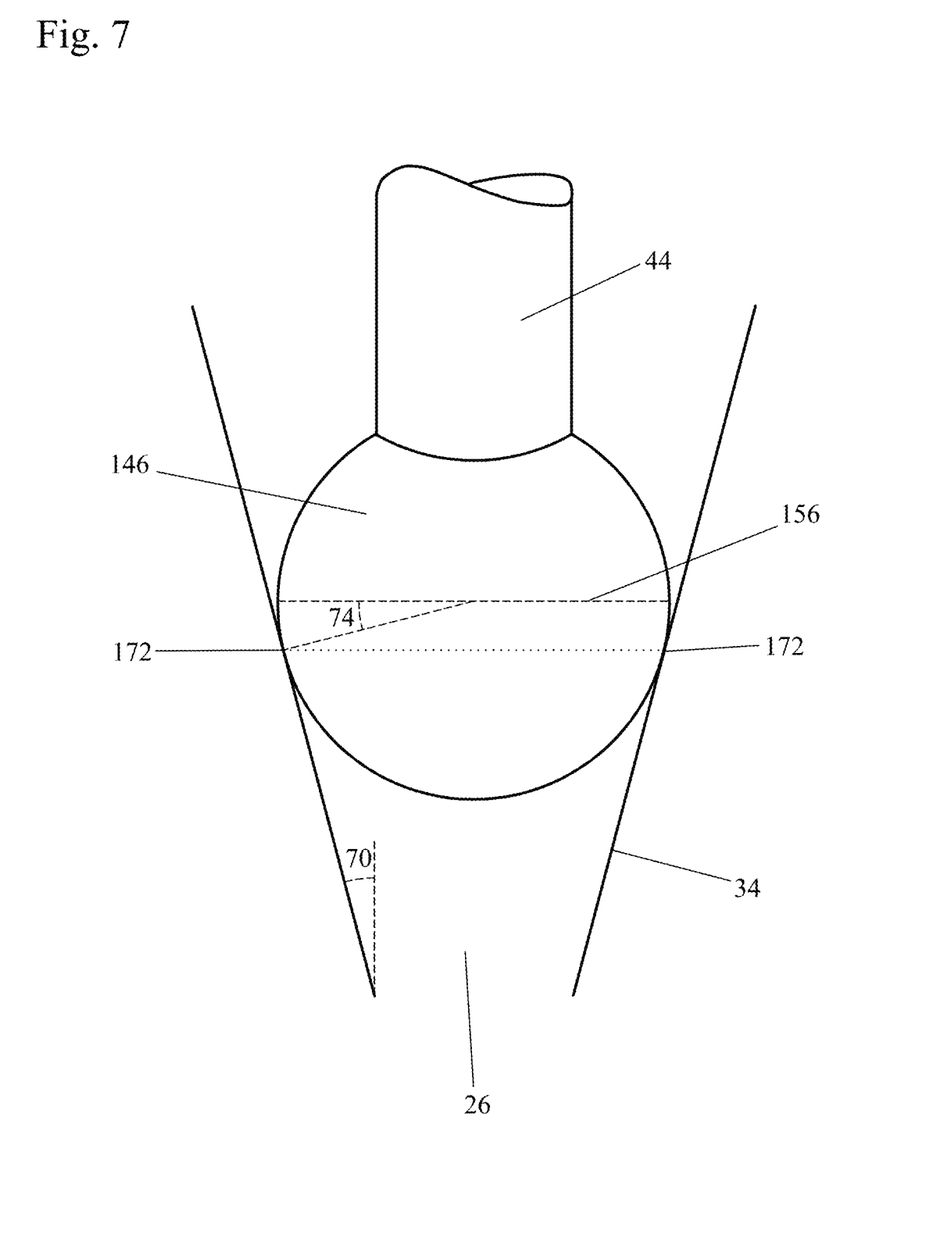
FIG. 7 shows a partial cross sectional view of the drain plug with a spherical tip in the tapered drain hole of the steeping cup.

FIG. 7 shows the tip 146 instead as a perfect sphere extending from the stem 44, resting in the perfect cone 34. The tip 146 makes contact at a circle of contact 172 with the cone 34 at an angle 74 below its centerline 156. The two angles 70, 74 are equal in value. The stem 44 may be tilted to any position, and the seal is maintained with the tip 146 maintaining the circle of contact 172 with the cone 34.

Figure 8:
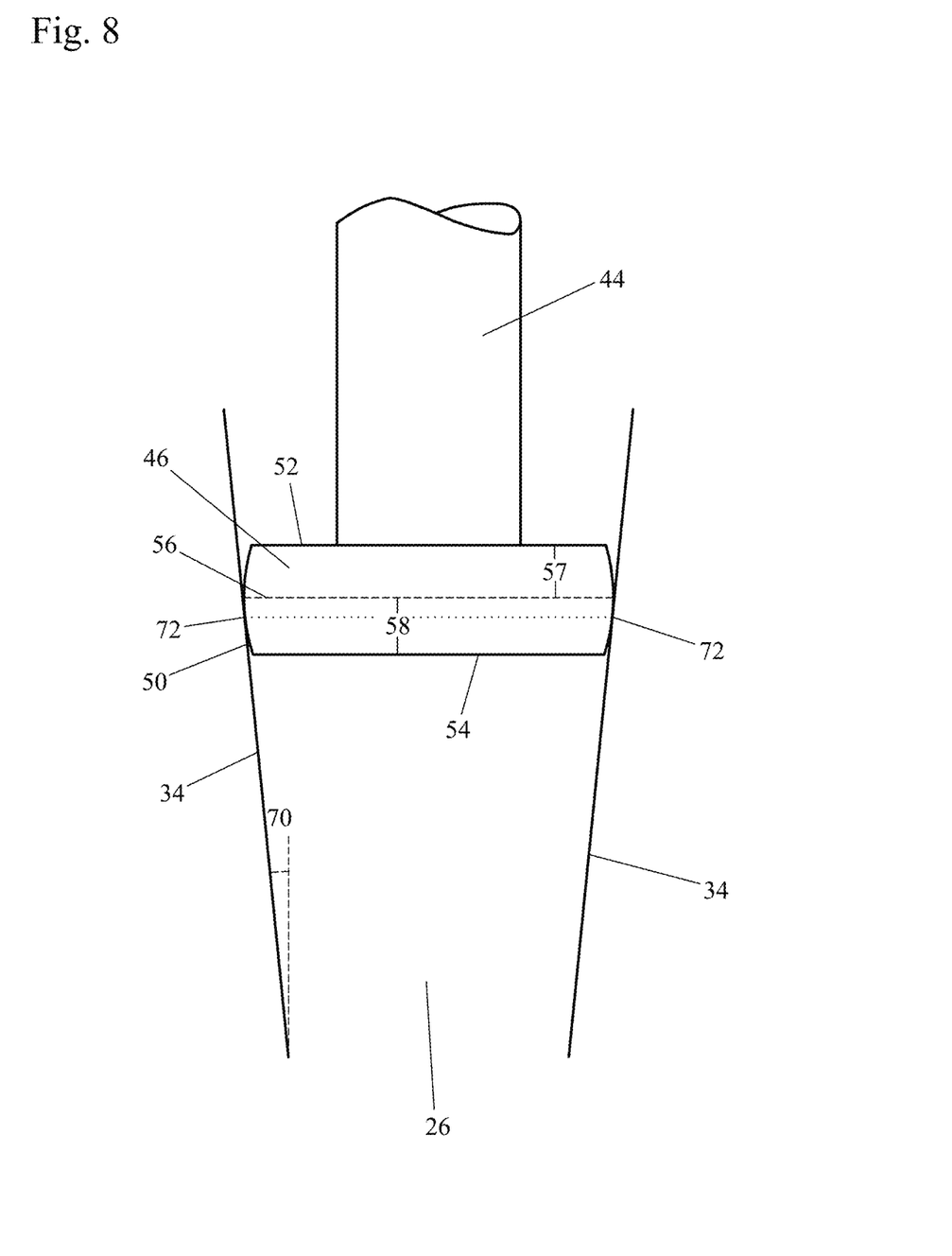
FIG. 8 shows a partial cross sectional view of the drain plug of FIG. 1 with a truncated spherical shape in the tapered drain hole of the steeping cup.

Referring to FIG. 8, showing a preferred truncated shape, the drain plug is sealing the tapered drain hole 26 with the stem 44 extending vertically upward coaxial with the central axis of the tapered drain hole 26. The tip 46 is in the form of a truncated sphere 50 contacting the tapered edge 34 of the tapered drain hole 26 to form a seal. The upper surface 52 and lower surface 54 are substantially flat so that the tip 46 has a uniform maximum thickness from top to bottom that is the distance between these two surfaces. The tapered drain hole 26 tapers at a drain angle 70 such that the tapered edge 34 has a conical shape. The truncated sphere 50 contacts the tapered edge 34 to form a circle of contact 72 around both components. The circle of contact 72 is located below the centerline 56 of the sphere of the tip 46. The first distance 57 above the centerline 56 is less than the second distance 58 below the centerline 56.

Figure 9:
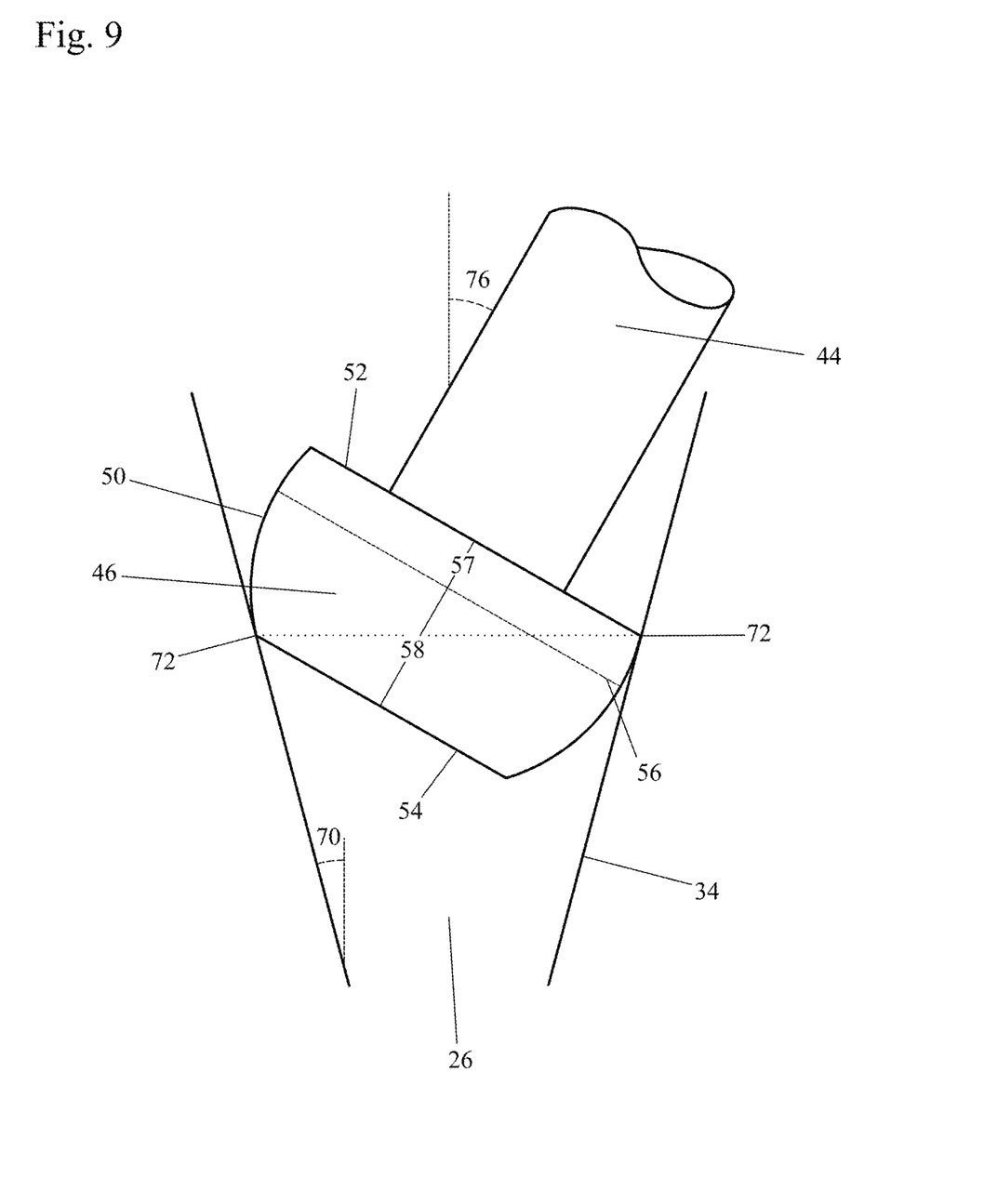
FIG. 9 shows another partial cross sectional view of the drain plug of FIG. 1 in the tapered drain hole of the steeping cup.

FIG. 9 shows the tip 46 again as a truncated sphere with a maximum design tilt of the stem 44 of stem angle 76. If the rod is tilted more than the stem angle 76 shown in FIG. 8, liquid will start flowing around the truncated sphere on both the left and right sides. In other words, as shown, the maximum amount of material has been removed from both the top and the bottom of the sphere. The truncated sphere extends above and below the centerline 56 by distances 57 and 58, respectively. If r is the radius of the sphere, H1 is the height above the centerline, H2 is the height below the centerline, A1 is the taper angle of the cone, and A2 is the maximum stem angle:

$$H1 = r \sin(A2 - A1) \qquad [1]$$

$$H2 = r \sin(A2 + A1) \qquad [2]$$

In a preferred embodiment, the taper angle (A1) is 2 degrees, the maximum stem angle (A2) is 12 degrees, and the sphere diameter is 0.375 inches. In such an embodiment, the minimum height above the centerline is 0.0326" and the minimum height below the centerline is 0.0454". In preferred embodiments, a little extra thickness is added to the theoretical minimum top and bottom thicknesses for safety. In some embodiments, the extra thickness is 0.01" added to both top and bottom for safety. The thinner the truncated sphere is, the faster and less expensive it may be produced by plastic injection molding.

In a preferred method of use of a single cup coffee brewer, the truncated sphere tip of the drain plug is placed in the tapered drain hole of the steeping cup. The drain plug is held by the handle and rotated about 90 degrees while applying slight pressure toward the tip and tilting the drain plug such that the drain plug handle contacts the sidewall of the steeping cup. The steeping cup is placed on a hot beverage container, preferably a coffee mug or coffee cup. The coffee filter is then placed in the steeping cup and a predetermined amount of ground coffee is placed in the coffee filter. A predetermined amount of hot water is added to the steeping cup, and the water and ground coffee are mixed in the steeping cup, if desired. The ground coffee is allowed to steep in the steeping cup for a predetermined period of time. The drain plug is then removed to break the seal between the tip and the drain to allow the filtered coffee to flow by gravity through the drain and into the hot beverage container.

Although the single cup coffee brewer has been described as being used with ground coffee to prepare a single cup of coffee, the single cup coffee brewer may be used to steep any steepable material. In some embodiments, the steeped material is tea leaves.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A single cup brewer comprising:
   a steeping cup comprising a sidewall extending from a base to form a contained space, and a thin-walled tapered drain formed from an elastic material extending from the base and away from the contained space, the tapered drain having a tapered drain hole enclosed by walls tapering at an angle in the range of 1°-3° from a top diameter to a bottom diameter through the base of the steeping cup; and
   a drain plug comprising a stem and a tip extending from a first end of the stem and having a diameter greater than a width of the stem, greater than the bottom diameter of the drain hole, and less than the top diameter of the drain hole, wherein the tip is spherical at least in a contact area where the tip of the drain plug makes contact with the walls of the tapered drain when the tip is inserted into the tapered drain;
   such that when the tip of the drain plug is seated in the tapered drain with the stem of the drain plug in contact with the sidewall of the steeping cup, the spherical contact area of the tip of the drain plug forms a circle of contact with the elastic material of the thin-walled material forming the tapered drain, permitting the drain plug to seal the tapered drain in the base of the steeping cup against leakage of liquid while a beverage is steeping in the steeping cup.

2. The single cup brewer of claim 1, wherein the steeping cup and the drain plug are formed of plastic by injection molding.

3. The single cup brewer of claim 2, wherein the plastic is polypropylene.

4. The single cup brewer of claim 1, wherein the steeping cup further comprises a plurality of ribs extending from the base into the contained space.

5. The single cup brewer of claim 1, wherein the steeping cup further comprises a rim around an edge of the sidewall, wherein the rim extends into a lip having a through-hole through the lip.

6. The single cup brewer of claim 1, wherein the steeping cup further comprises an inner ring and an outer ring extending from the base away from the contained space.

7. The single cup brewer of claim 1, wherein the stem has a substantially cylindrical shape.

8. The single cup brewer of claim 1, wherein the drain plug further comprises a handle extending from a second end of the stem opposite the first end.

9. The single cup brewer of claim 1, wherein the tip is a sphere which is truncated substantially perpendicular to an axis of the stem on a top surface of the tip above the spherical contact area and is truncated substantially perpendicular to an axis of the stem on a bottom surface of the tip below the spherical contact area and opposite the top surface.

10. The single cup brewer of claim 9, wherein the tip has a tip thickness from the top surface to the bottom surface selected to provide a seal between the tip and the tapered drain up to a predetermined maximum tilt angle of the stem with respect to vertical.

11. The single cup brewer of claim 9, wherein the predetermined maximum tilt angle is in the range of eight to sixteen degrees.

12. The single cup brewer of claim 9, wherein the tip thickness includes a first height (H1) from the top surface to a centerline running through the center of the sphere parallel to the top surface and the bottom surface of the tip and a second height (H2) from the bottom surface to the centerline, wherein the first height and the second height in inches are selected such that:

$$H1 = r\sin(A2 - A1) + 0.01''; \text{ and}$$

$$H2 = r\sin(A2 + A1) + 0.01'';$$

wherein r is the radius of the sphere in inches, A1 is a taper angle of the tapered drain hole, and A2 is the predetermined maximum tilt angle.

13. A method of brewing a single cup of a beverage comprising:
   a) sealing a thin-walled tapered drain of a steeping cup with a tip of a drain plug, wherein the steeping cup comprises a sidewall extending from a base to form a contained space, and the tapered drain is formed of an elastic material extending from the base away from the contained space, the tapered drain having a tapered drain hole enclosed by walls tapering at an angle in the range of 1°-3° from a top diameter to a bottom diameter through the base of the steeping cup, and wherein the drain plug comprises a stem and the tip extending from a first end of the stem and having a diameter greater than a width of the stem, greater than the bottom diameter of the drain hoe, and less than the top diameter of the drain hole, wherein the tip is spherical at least in a contact area when the tip is inserted into the tapered drain, such that when the tip of the drain plug is seated in the tapered drain with the stem of the drain plug in contact with the sidewall of the steeping cup, the spherical contact area of the tip of the drain plug forms a circle of contact with the elastic material of the thin-walled material forming the tapered drain, permitting the drain plug to seal the tapered drain in the base of the steeping cup against leakage of liquid while the beverage is steeping in the steeping cup;
   b) placing the steeping cup on a hot beverage container;
   c) placing a filter in the contained space;
   d) placing a predetermined amount of ground coffee or tea leaves in the filter;
   e) placing a predetermined amount of hot water in the contained space;
   f) allowing the ground coffee or tea leaves to steep in the contained space for a predetermined period of time; and
   g) unsealing the tapered drain and allowing filtered coffee or filtered tea to flow by gravity through the tapered drain and into the hot beverage container.

14. The method of claim 13, wherein the step of sealing comprises rotating the drain plug by about 90 degrees with the tip in the tapered drain hole and tilting the drain plug such that the stem of the drain plug contacts the sidewall of the steeping cup.

* * * * *

UNITED STATES PATENT AND TRADEMARK OFFICE
CERTIFICATE OF CORRECTION

PATENT NO. : 9,498,080 B2  
APPLICATION NO. : 14/693111  
DATED : November 22, 2016  
INVENTOR(S) : David de Neufville Page 1 of 1

It is certified that error appears in the above-identified patent and that said Letters Patent is hereby corrected as shown below:

Claim 13 (Column 6, Line 42): "drain hoe," should read "drain hole,"

Signed and Sealed this
Twenty-eighth Day of March, 2017

Michelle K. Lee  
*Director of the United States Patent and Trademark Office*